United States Patent [19]

Chiles et al.

[11] Patent Number: 5,022,459
[45] Date of Patent: Jun. 11, 1991

[54] FLEXIBLE HOSE HEAT EXCHANGER CONSTRUCTION WITH COMBINATION LOCATING AND THAWING WIRE

[76] Inventors: Daniel T. Chiles, 1972 S. Oak Grove, Springfield, Mo. 65802; Richard M. Chiles, 5000 Shady Oaks Dr., Springfield, Mo. 65804

[21] Appl. No.: 280,543

[22] Filed: Dec. 6, 1988

[51] Int. Cl.$^5$ .............. F24D 3/00; F24D 13/04; F16L 55/00
[52] U.S. Cl. .............. 165/11.1; 165/56; 237/69; 219/213; 138/33; 138/125; 138/DIG. 2; 405/157; 174/47; 392/472; 392/478
[58] Field of Search .............. 165/56, 49, 11.1; 219/213, 301, 307; 237/69; 174/37, 47; 138/33, 125, DIG. 2; 405/157; 324/67

[56] References Cited

U.S. PATENT DOCUMENTS

| Re. 30,393 | 9/1980 | Sherlock | 174/47 |
|---|---|---|---|
| 1,550,185 | 8/1925 | Steenstrup | 237/69 |
| 3,547,162 | 12/1970 | Schaerer | 138/125 |
| 4,038,519 | 7/1977 | Foucras | 219/301 |
| 4,270,596 | 6/1981 | Zinn et al. | 165/49 |
| 4,449,098 | 5/1984 | Nakamura et al. | 405/157 |

FOREIGN PATENT DOCUMENTS

| 1964395 | 10/1971 | Fed. Rep. of Germany | 165/49 |
|---|---|---|---|
| 2103394 | 8/1972 | Fed. Rep. of Germany | 174/47 |
| 2246217 | 3/1974 | Fed. Rep. of Germany | 174/47 |
| 2418114 | 10/1975 | Fed. Rep. of Germany | 174/47 |
| 1178198 | 5/1959 | France | 138/33 |
| 0077838 | 5/1982 | Japan | 165/56 |
| 0264863 | 6/1970 | U.S.S.R. | 138/33 |

OTHER PUBLICATIONS

Levy, R. M. "Glass Reinforced Plastic Piping" Heating, Piping & Air Conditioning vol. 33; No. 1, Jan. 1961, pp. 182–186.

*Primary Examiner*—John Ford
*Attorney, Agent, or Firm*—Kokjer, Kircher, Bradley, Wharton, Bowman & Johnson

[57] ABSTRACT

A flexible hosing for circulation of a heat transfer fluid to effect heat exchange within a concrete or other type of slab. An inner wall comprising nylon, rayon or other similar material forms an inner wall of the hosing to resist corrosive attack by the heat transfer fluid. A locator wire is embedded within the hosing for transmission of a locating signal so that the position of the hosing within the slab may be accurately determined. The wire may also serve as an electrical resistance heating element should the heat transfer fluid become frozen, or should it be desired that the heat exchange system be operated without an external boiler or other heat source.

1 Claim, 3 Drawing Sheets

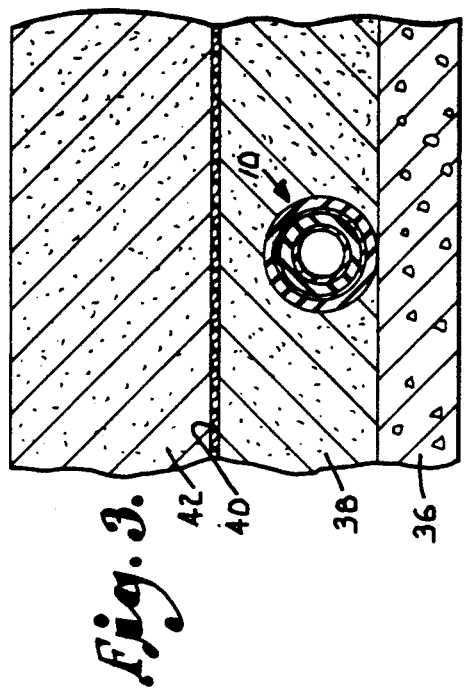
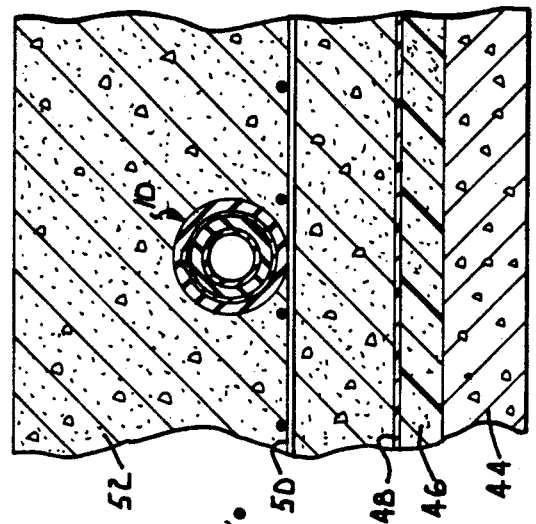
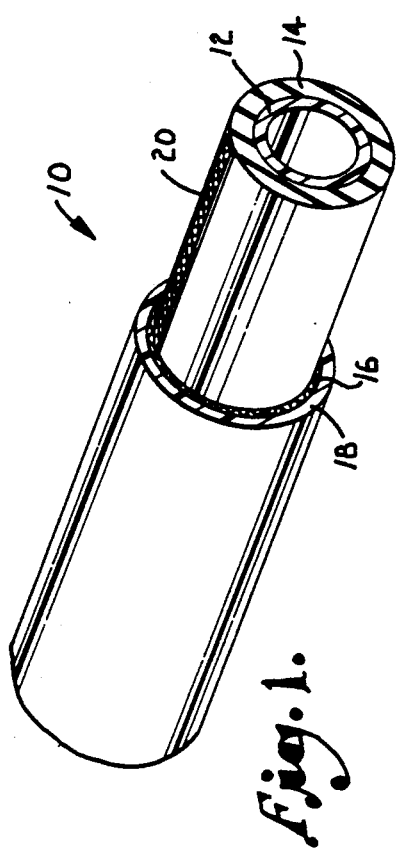
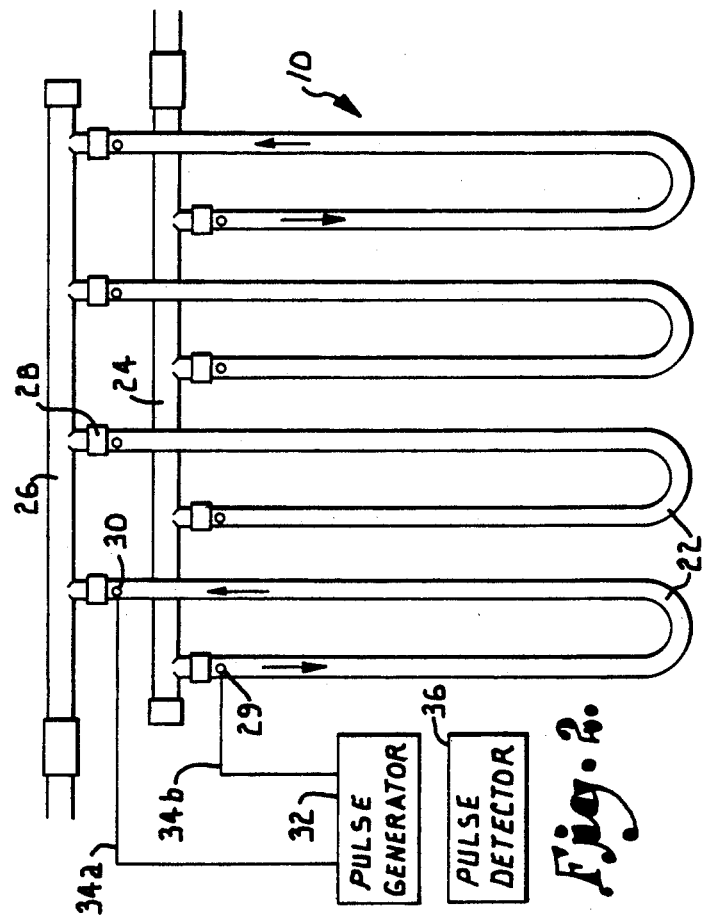

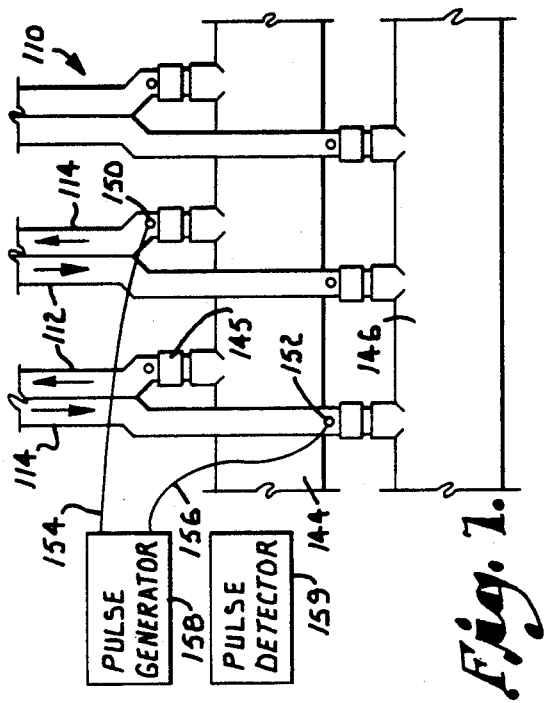
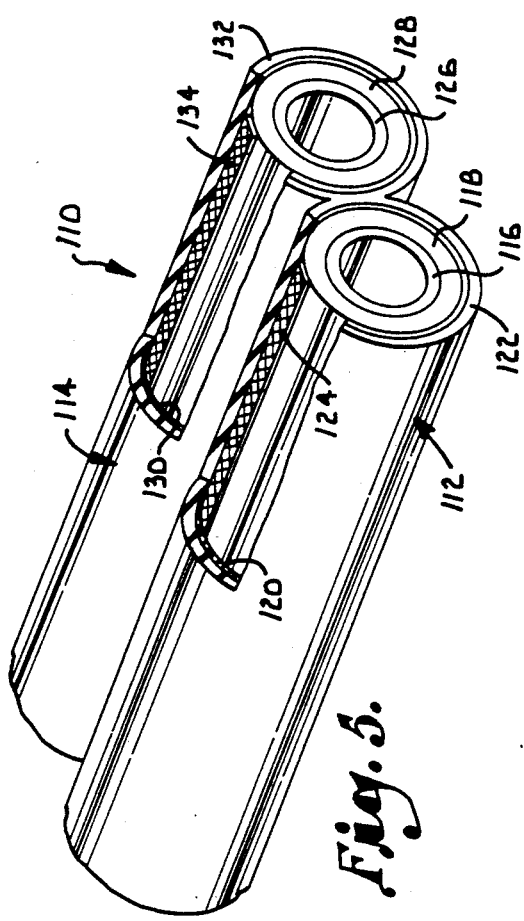
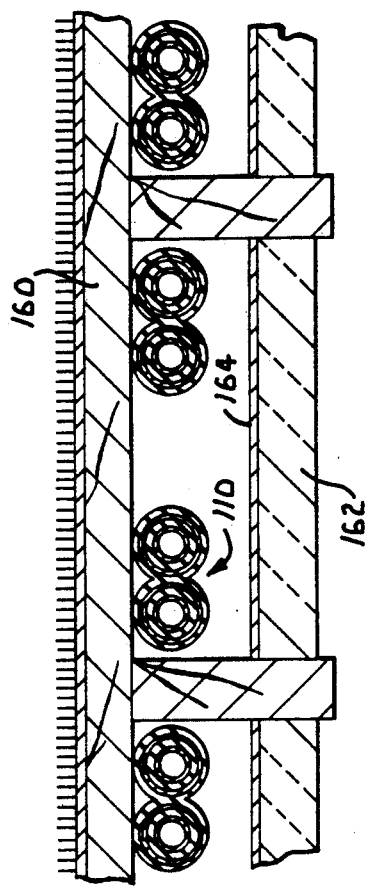
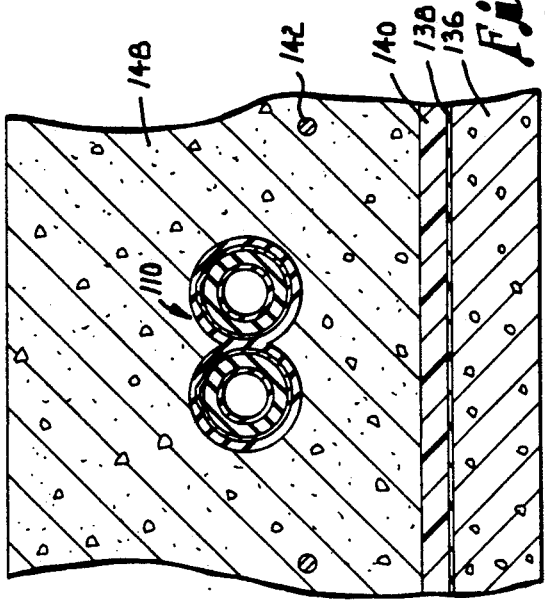

FLEXIBLE HOSE HEAT EXCHANGER CONSTRUCTION WITH COMBINATION LOCATING AND THAWING WIRE

BACKGROUND OF THE INVENTION

This invention relates in general to heat exchanger constructions and, more particularly, to hosing for embedding in a slab of concrete, asphalt and other materials to circulate a heat transfer fluid to provide for heat exchange.

It is often desired to heat surfaces such as driveways, parking lots, roadways and sidewalks to remove or to prevent the accumulation of ice and snow from the surface. Heating of interior surfaces such as floors, walls, or ceilings may also be desired to provide a method of heating an area such as a room by radiant heat. Various methods have been employed to provide such heating yet each suffers from one or more deficiencies.

Electric resistance wires embedded in the concrete slab have been frequently used as one method of providing head exchange because the wires are easily installed. These wires, however, are fragile and are likely to break as the concrete slab inevitably settles. Repair of these breaks is often time consuming as the exact location of the breakage is difficult to determine. The heat flux emitted by the wires is also limited by the ability of the relatively small surface area of the wires to conduct heat to the surrounding matrix without the insulating materials covering the wire failing from overheating. The materials used to electrically insulate the wires are also very brittle and subject to corrosion from such common materials as road salt.

Tubes have also been embedded in slabs of concrete and other materials to circulate a heat transfer fluid which warms the surrounding concrete. Conventional heat exchanger tubing is also prone to breakage resulting from settling of the slab, freezing of the heat transfer fluid, and corrosive attack by chemicals seeping through the slab. The tubing may also be subject to corrosive attack by the heat transfer fluid.

Breakage of the tubing causes leakage of the heat transfer fluid and may result in significant damage to the building and its furnishings. Pinpointing the points of breakage is difficult because the heat transfer fluid may seep through cracks in the slab and surface at a location remote from the point of breakage. The difficulty in locating the tubing once embedded in the slab also presents problems when penetration of the slab is required such as when repairs to the slab are to be effected or equipment bolted or otherwise anchored to the slab.

Tubes constructed from iron, copper or other metals, in addition to being expensive to install, are unsatisfactory in asphalt slabs because of the significant difference in the thermal expansion between the metal and asphalt. Repeated cycles of temperature change often result in the expanding metal to cause cracking of the asphalt, thus exposing the metal tubes to corrosion and weakening.

Plastic tubes which allow atmospheric oxygen to enter the system are unsatisfactory as the oxygen results in severe corrosion of the pumps, boilers and other heat exchanger components. Plastic tubing is also subject to corrosive attack by petroleum distillates, solvents, cleaning fluids and other chemicals that seep through cracks which develop in the concrete as it ages. Some types of plastic tubes are also subject to complete failure at elevated temperatures which may occur due to malfunctioning of heat exchangers or boilers. Plastic tubes are also subject to premature failure in hydronic radiant heating systems due to the continuous flow of hot water through the system that leaches out both the plasticizing agents that maintain the flexibility of the piping, and the anti-oxidants that maintain the strength of the piping. As these agents are removed, many types of plastic tubing, including the most common, polybutylene, become increasingly weakened and embrittled with use.

SUMMARY OF THE INVENTION

It is an object of this invention to provide a heat exchanger construction with a flexible hosing capable of withstanding breakage when the concrete or other material in which it is embedded settles, cracks or otherwise shifts.

It is also an object of this invention to provide a heat exchanger construction having a flexible hosing embedded in a slab of concrete, asphalt or other material and which includes an electrically conductive wire for transmission of a locating signal so that the exact position of the hosing may be determined to effect repairs to the slab or the hosing.

It is another object of the invention to provide a heat exchanger construction having a flexible hosing for embedding in a slab and which incorporates a locating wire wire may be used to thaw the heat exchanger fluid if it should be allowed to freeze.

It is a further object of this invention to provide a heat exchanger construction having a flexible hosing for embedding in or under a slab of concrete, asphalt, or other material and which includes an electrically conductive wire which may be used for locating purposes and for emergency melting of heat exchange fluid if it be accidentally allowed to freeze and which can also be used as the sole source of heat in an electric resistance driven system.

It is a still further object of this invention to provide a heat exchanger construction having a flexible hosing with an inner layer constructed of a high temperature elastomeric polymer material to withstand corrosive attack by the heat transfer fluid as well as chemicals which have penetrated the hosing after seeping through the slab in which the hosing is embedded.

To accomplish these and other related objects of the invention, a heat exchanger construction is provided with a flexible hosing having an inner layer of a high temperature elastomeric polymer material such as nylon, EPDM (ethylene proplylene diene monomer), SBR (styrene-butadiene rubber), CPE (chlorinated polyethylene), or high temperature polyethylene. The inner layer may be surrounded by a woven layer of rayon or polyester fiber for reinforcement. Alternately, a flexible, high temperature polymeric material such as EPDM or SBR may be positioned between the inner layer and the reinforcement fiber. The hose is provided with a cover of polymeric material such as CPE and other materials which are highly resistant to chemical attack and high temperatures. An electrically conductive wire is positioned within the hosing for transmission of a locating signal. The locating wire also functions as a resistance heating element when sufficient electrical current is circulated through the wire to thaw the heat transfer fluid if it should accidentally be allowed to freeze. In some applications, the locating wire may be constructed so as to furnish sufficient heat from electric resistance so as to melt snow and ice, or otherwise provide for the entire heating load, so that the hosing may operate independently of an outside heat source.

BRIEF DESCRIPTION OF THE DRAWINGS

In the accompanying drawings in which like reference numerals are used to indicate like parts in the various views:

FIG. 1 is a perspective view of a first embodiment of a flexible hosing for a heat exchanger construction with portions broken away to illustrate the composite layers of material;

FIG. 2 is a schematic view showing the hosing of FIG. 1 arranged in several loops and connected to a supply and a return manifold, an electrical pulse generator being coupled across one of the loops;

FIG. 3 is a vertical cross-sectional view of the flexible hosing of FIG. 1 shown embedded in asphalt;

FIG. 4 is a vertical cross-sectional view of the flexible hosing of FIG. 1 shown embedded in concrete;

FIG. 5 is a perspective view of a second embodiment of a flexible hosing for a heat exchanger construction;

FIG. 6 is a vertical cross-sectional view of the flexible hosing of FIG. 5 shown embedded in a concrete or masonry slab;

FIG. 7 is a schematic view showing the flexible hosing of FIG. 5 attached to a supply and a return manifold and coupled with a locating signal generating device; and FIG. 8 is a vertical cross-sectional view illustrating installation of the hosing of FIG. 5 below a floor surface.

DESCRIPTION OF THE PREFERRED EMBODIMENTS

Figure 11:
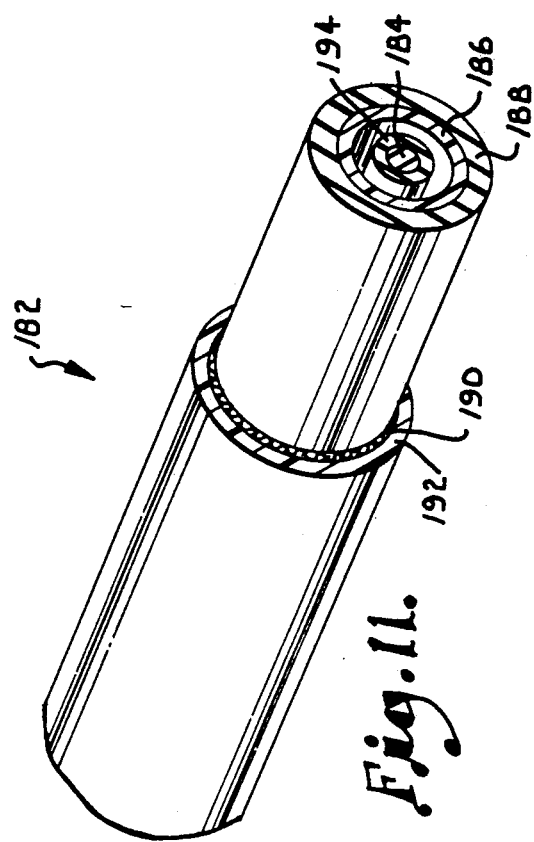
FIG. 11 is a perspective view of an additional embodiment of a flexible hosing for a heat exchanger construction with portions broken away for purposes of illustration.

Referring now to the drawings in greater detail, and initially to FIGS. 1-4, a composite, flexible hosing of the present invention is represented generally by the numeral 10. Hosing 10 is adapted for carrying a heat transfer fluid for heat transfer within a slab of concrete, asphalt, masonry, or other material.

Hosing 10 comprises an inner wall 12 constructed of a high temperature, elastomeric, polymer material and is adapted to present a conduit for the flow of heat transfer fluid through the hosing 10. The inner wall 12 is preferably constructed of nylon, teflon, Hypalon ®, EPDM, SBR, nitrile, polyester or high temperature polymers. Other materials may also be utilized which are capable of withstanding the high temperatures of the heat transfer fluid and are resistant to corrosive attack by a range of heat transfer fluids as well as solvents, cleaning fluids, or other corrosive chemicals that might penetrate the hosing from cracks in the surrounding slab. The material chosen may also be resistant to oxygen permeation to prevent entry of oxygen into the closed loop system. The inner wall may also incorporate fungicides, algacides and/or bacteriacides to retard the growth of undesired organisms in the heat transfer fluid.

The inner wall 12 of composite hosing 10 may also be surrounded by an intermediary layer 14 of a high temperature polymeric material which provides added reinforcement to the hosing 10 and promotes adhesion between the inner wall and fabric braid 16. Intermediary layer 14 must be flexible and preferably is resistant to corrosive attack by chemicals which might penetrate the hosing. Suitable materials which may be utilized for intermediary layer 14 include EPDM, SBR or neoprene. Other materials having the desired properties may also be utilized.

A fabric braid 16 is used to provide added reinforcement to hosing 10. Fabric braid 16 surrounds intermediary layer 14 and preferably comprises woven rayon, fiberglass, nylon, polyester thread, or metal wire. Other materials having the desired flexibility and reinforcing characteristics may also be utilized. Fabric braid 16 is preferably tightly wound over the optional intermediary layer 14 to increase the pressure and puncture resistance of hosing 10. A two over two basket weave or a spiral weave have been found to provide the desired reinforcing characteristics although other weaves may also be acceptable.

A cover 18 surrounds fabric braid 16 and preferably comprises CPE, nitrile, nitrile-PVC, EPDM, neoprene, Hypalon ®, or chlorobutyl. The cover protects hosing 10 from the oils and petroleum distillates present in an asphalt slab or from solvents, cleaning fluids, or other chemicals that might leak through the slab in which the hosing is embedded. The choice of material for cover 18 is selected to withstand the specific environmental conditions to which the hosing is subjected in a particular application.

Carbon compounds such as graphite may be incorporated into cover 18 to enhance the heat transfer characteristics of hosing 10. Other materials such as aluminum, iron, copper, titanium and other powdered metals may also be incorporated in the cover for this purpose.

As best shown in FIG. 1, hosing 10 includes an electrically conductive wire 20 which is used for the transmission of a locating signal. Locating wire 20 is positioned between intermediary layer 14 and reinforcing braid 16 but may alternately be positioned between inner wall 12 and intermediary layer 14, or between reinforcing braid 16 and cover 18. The wire may also be embedded within one of composite layers of the hosing 10. Wire 20 is preferably of a flat, braided construction to provide the desired flexibility and is constructed from materials having the necessary conductivity for transmitting an electrical locating signal. The material selected for wire 20 must also have electrical resistance characteristics such that the wire functions as a resistance heating element when when a sufficient electrical current is applied to the wire. The wire preferably extends longitudinally along the length of the hosing 10 but may also be spirally wrapped or formed into a grid surrounding the intermediary layer 14. The wire may also be built into the inner wall 12, cover 18, or may be incorporated into the reinforcing braid 16.

As illustrated in FIG. 2, the hosing 10 is arranged in a plurality of loops 22 with one end of the hosing in each loop being connected with a supply manifold 24 and the other end being connected to a return manifold 26. The manifolds are preferably made of copper and include suitable connectors 28 for attachment to the ends of the hosing in each loop. Electrical connectors 29 and 30 are provided at the ends of the hosing in each loop. The connectors are coupled with the electrical locating wire 20 provided within the hosing in each loop. The wire 20 in each loop is preferably insulated from the supply and return manifolds so that each loop may form a separate circuit. The manifolds, connectors 28, and terminals 29 and 30 are preferably located above ground so they are easily accessible.

An electrical pulse generating device 32 of a known construction may be coupled by leads 34a and 34b across terminals 29 and 30 connected to wire 20 to generate a locating signal along the wire. A pulse detector 35 also of known construction is provided for receiving the generated signal to pinpoint location of the wire.

One method of installing hosing 10 within a slab will be described with reference to FIG. 3. A bed of crushed rock 36 is prepared on the surface of the ground and the hosing is then arranged on the rock bed 36 in the desired loop configuration with the ends of the hosing in each loop connected to the supply and return manifolds. Heat transfer fluid is then circulated through the hosing 10 to maintain the shape of the hosing while a first layer 38 of asphalt is applied and compacted. Circulation of the heat transfer fluid is also desirable to protect the hosing from the high asphalt temperatures which can range between 275°–350° F. during application. An environmental fabric layer 40 is applied over the first asphalt layer 38 and a second asphalt layer 42 is then applied and compacted to complete the process.

A process for embedding the hosing 10 within a concrete slab will described with reference to FIG. 4. A gravel bed 44 is first prepared on the ground surface with a layer 46 of polystyrene insulation being applied over the gravel bed. A polyethylene vapor barrier 48 is positioned above the insulation layer 46 and a wire mesh 50 is supported at a position spaced above vapor barrier 48. The hosing 10 is then arranged in the desired loop configuration on top of the wire mesh 50 with the ends of the hosing in each loop being connected to the supply and return manifolds. A layer of concrete 52 is then applied on top of vapor barrier 48 with the hosing 10 being embedded at a pre-selected depth within the concrete slab 52.

In operation, a heat transfer fluid is heated by a boiler (not shown) and routed to the hosing loops 22 by supply manifold 24. The fluid circulates through each loop and is collected in return manifold 26 and circulated back to the boiler. The heat transfer fluid circulating within the hosing 10 transfers heat to the surrounding slab to melt snow and ice on the slab surface or to provide radiant heating within a structure. The hosing may also be operated as a device for transferring heat from the slab to the heat transfer fluid.

The use of the described materials for the inner wall 12 of hosing 10 protect the hosing from deterioration resulting from corrosive attack by the circulating heat transfer fluid. The inner wall also prevents leakage of the heat transfer fluid should corrosive chemicals attack the hose from the surrounding slab. The use of material having low oxygen permeability is particularly beneficial as it prevents entry of oxygen into the closed loop environment of the heat exchanger system where it might cause severe corrosion of the metallic components of the system. In addition, the low coefficient of friction of the described materials reduces the head pressure required to circulate heat transfer fluid through the conduit in the hosing.

An important aspect of this invention is the provision of locating wire 20 which allows a locating signal to be transmitted through the wire so that the position of each loop 20 of hosing 10 may be pinpointed using detector 35. Determination of the exact location of the hosing is important if repairs to the slab are required or if the slab is to penetrated by anchor bolts or the like. To locate the hosing, a locating signal is generated by coupling leads 34a and 34b of pulse generator 32 across terminals 29 and 30 of one loop 22. An electrical signal is then pulsed through the wire to provide a locating signal which may be detected by device 35. This procedure may then be repeated until all of the loops are pinpointed. It can also be seen that the pulse generator 32 may be used to pinpoint the exact location of the loops 22 so that the slab overlying a leaking hosing loop may be removed and repairs effected.

If the heat transfer fluid within hosing 10 should freeze, wire 20 may be utilized as a resistance heating element to thaw the fluid. A suitable source of electric current is coupled across terminals 29 and 30 and an appropriate level of electrical current is directed through the wire. This unique capability to thaw the frozen heat transfer fluid reduces the risk of damage to the system and the surrounding slab which might otherwise occur. Being able to thaw out a frozen system not only minimizes damage that might occur to the system, but also gives the operator the unique ability to start up a system in below freezing weather that would otherwise preclude the user from enjoying the benefits of the system until above freezing conditions naturally thawed out the system. This is of particular benefit in mountainous areas, or in special applications, such as hospital entry areas, where the presence of ice on walkways presents a special hazard to the public. Because the wire 20 is insulated from the surrounding slab by cover 18, there is no risk of electrification of conductive portions of the slab such as wire grid 50.

Another important aspect of the invention is the ability to determine when the hosing within one of the loops has been completely or partially severed so that wire 20 is no longer continuous. This condition can be detected by an open circuit when pulse generator 32 is connected across the terminals 29 and 30 at the ends of the wire.

Turning to FIGS. 5–8, an alternate embodiment of a heat transfer hosing 110 which allows countercurrent flow of a heat transfer fluid for improved temperature distribution will now be described. Hosing 110 comprises twin hoses 112 and 114 which are coupled together and extend in parallel relationship to present adjacent conduits for countercurrent flow of the heat transfer fluid.

Hose 112 comprises an inner wall 116 surrounded by an optional intermediary layer 118 which in turn is surrounded by a fabric reinforcing braid 120. A cover 122 surrounds fabric braid 120 and a braided wire 124 is positioned between braid 120 and intermediary layer 118. Hose 114 likewise comprises an inner wall 126 surrounded by an optional intermediary layer 128, a fabric braid 130 and a cover 132. A signal wire 132 is positioned between intermediary layer 128 and braid 130.

Each hose 112 and 114 is preferably constructed in a manner and of materials previously described in conjunction with hosing 10. The hoses 112 and 114 are joined together by their covers 122 and 132 or in other suitable methods so that inner walls 116 and 126 present conduits for circulation of the heat transfer fluid within hosing 110.

One method of installation of hosing 110 can be seen with reference to FIG. 6. A gravel bed 136 is prepared and overlaid by a polyethylene barrier 138. An insulating layer 142 is placed over the vapor barrier 138. Reinforcing bars 142 are then spaced over the insulating layer and the hosing 110 is arranged on the bars in the desired loop configuration. One end of hose 114 in each loop is then connected to a supply manifold 144 using suitable connectors 145. The corresponding end of hose 112 in each loop is connected to a return manifold 146. The other ends of hoses 114 and 112 are then connected to return manifold 146 and supply manifold 144 respectively. A layer of concrete 148 is then poured to form a slab with the hosing 110 embedded therein.

Each hose in each loop includes an electrical connector 150 and 152 at each end. The connectors are coupled with the wire 134 or 124 in the hose and form a complete circuit when leads 154 and 156 of a pulse generator 158 are connected across the connectors. It is preferred that each loop be electrically isolated so that a separate circuit may be formed in each loop. Pulse generator 158 may be utilized in a manner previously described with respect to generator 32 to generate a locating signal. A pulse detector 159 such as detector 36 previously described is provided for detecting the signal pulsed through wire 134 or 124 to allow accurate determination of the position of individual loops of hosing 110 within slab 148.

In operation, heat transfer fluid is heated and circulated in a manner such as that described in conjunction with hosing 10. The use of twin hoses 112 and 114 allows a countercurrent flow of the heat transfer fluid within hosing 110 to ensure that the average temperature along the length of each loop of hosing 110 remains relatively constant. This type of construction is particularly desirable when the hosing is used to heat buildings and other structures where equalized temperature distribution is required.

In some applications it may be desired to place the hosing 110 underneath a floor surface without embedding the hosing within a slab. One type of installation is illustrated in FIG. 8 where the hosing is attached to an undersurface of floor 160. Because of the heat loss associated with the open area below the floor, it is preferred that an insulating panel 162 and a radiant barrier 164 be placed beneath the hosing 110.

Figure 9:
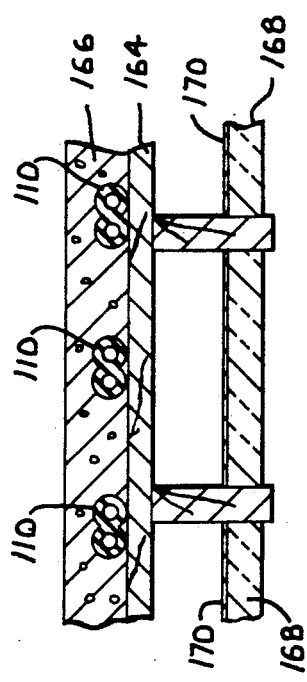
FIG. 9 is a vertical cross-sectional view illustrating installation of the hosing of FIG. 5 above a subfloor surface in a thin cementitious slab.

Another type of installation is illustrated in FIG. 9 where hosing 110 is installed above a floor 164 in a matrix of concrete or similar cementitious material 166. It is preferred that an insulating panel 168 and radiant barrier 170 be placed below the floor 164 to reduce heat loss.

Figure 10:
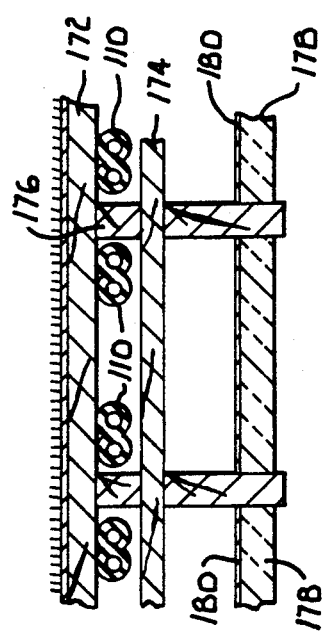
FIG. 10 is a vertical cross-sectional view illustrating installation of the hosing of FIG. 5 between a subfloor and the finished floor surface.

A further type of installation is illustrated in FIG. 10 where hosing 110 is installed between two layers of flooring 172 and 174 with the layers of flooring being separated by spacing blocks 176. As in the installation illustrated in FIG. 9, an insulating panel 178 and radiant barrier 180 may be placed below the subfloor 174. Where accessibility is limited, however, the insulating panel and radiant barrier may be installed on top of floor 174 and underneath hosing 110 by using appropriate sized spacing blocks 176.

Turning now to FIG. 11, a hosing 182 having a locating wire 184 which may be used to supply the entire heating load independently of a boiler or other heat source will now be described. Hosing 182 comprises an inner wall 186, intermediary layer 188, fabric braid 190 and cover 192 which may be identical to the corresponding components previously described in conjunction with hosing 10. Depending upon the severity of the application, one or more of the intermediary layer 188, fabric braid 190, and cover 192 may be omitted.

Hosing 182 differs from hosing 10 in that locating wire 184 is positioned within the inner conduit formed by inner wall 186. Wire 184 is surrounded by a waterproof sheath 194 to protect the wire from a heat transfer fluid maintained within the conduit. Locating wire 184 is of sufficiently heavy construction so that the entire heat output of the system is generated by the electrical resistance of the locating wire. The heat transfer fluid aids in passage of heat from the wire to the outer surfaces of hosing 182 for heating of the slab in which the hosing is embedded. Water, water/glycol mixtures, silicone fluids, petroleum based heat transfer fluids, are examples of suitable heat transfer fluids which may be used to fill the conduit surrounding wire 184. Other fluids may also be used.

Hosing 182 may be installed in any of the manners previously described. In use, electrical current is supplied to wire 184 and is controlled by a suitable outside control device. Heat generated by the resistance wire is then transferred to the heat transfer fluid and through the composite layers of the hosing 182 to the surrounding slab. If desired, the heat transfer fluid may be circulated through the hosing to evenly distribute the generated heat and reduce the incidence of cold spots if a portion of the electrical circuit should fail. An automatic fill valve may also be added to compensate for fluid loss and prevent overheating of a portion of the hosing if a heat transfer fluid leak should occur.

Hosing 182 advantageously supplies the necessary heating without the expense and maintenance associated with boilers and other methods of heating the heat transfer fluid. Hosing 182 has much greater resistance to shear and movement in the surrounding matrix as compared to existing electric resistance systems. The hosing construction will also protect the resistance wire from external sources of corrosion and an optional oxygen permeation barrier may be added for further protection. To avoid overheating of the electrical insulation components of hosing 182, the exterior surface area of hosing 182 is selected in cooperation with the heat output of electric resistance wire 184 to accommodate the desired system design requirements.

It can thus be seen that the hosing of the present invention provides the flexibility required to withstand the stresses caused by settling of the slab in which the hosing is embedded. The use of a high temperature elastomeric polymer material as an inner wall provides a conduit for the flow of heat transfer fluid and also protects the hosing from corrosive attack by the fluid. An elastomeric polymer cover surrounding the inner wall protects the hosing from corrosive attack by chemicals seeping through fractures in the slab. The inner wall also protects the integrity of the flow conduit as it is resistant to any such chemicals which should penetrate through the hosing cover. The inner wall further serves to prevent oxygen entry into the closed loop heat exchange system where it would cause undesired corrosion. In addition, the inner wall has a reduced coefficient of friction so that a lower liquid head is required to circulate the heat transfer fluid through the hosing.

Another important feature of the invention is the use of a locator wire which may be coupled with a pulse generator to provide a detectable locating signal. This permits precise determination of the positioning of the hosing so that repairs to the slab or hosing may be effected. Determination of the location can also be important when anchor bolts or other devices are to be inserted into the slab. The wire may advantageously be used as a resistance heating element should freezing of the heat transfer fluid occur and may also be used as the sole source to supply the heating load.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. In a structural slab, a heat exchange arrangement comprising:
   a multiple layer flexible hose embedded in said slab and presenting a conduit for flow of heat exchange fluid therethrough for effecting heat exchange with the slab;
   an electrically conductive metal wire extending the length of the hose;
   a pair of terminals connected with said wire and situated at locations accessible from the exterior of the slab to permit application of electrical current to the wire;
   means for applying an electrical locating signal to said terminals to apply the locating signal to the wire in a manner to permit detection of the location of the wire from the exterior of the slab; and
   means for applying electrical current to said terminals at a level to effect heating of said wire sufficient to thaw the heat exchange fluid from a frozen state.

* * * * *